Patented Feb. 17, 1942

2,273,040

UNITED STATES PATENT OFFICE 2,273,040

CHEMICAL PROCESS AND PRODUCT

Ralph K. Iler, East Cleveland, Ohio, assignor to E. I. du Pont de Nemours & Company, Wilmington, Del., a corporation of Delaware No Drawing. Application September 26, 1940, Serial No. 358,479

18 Claims. (Cl. 91—68)

This invention relates to waterproofing compositions and processes for producing them, to processes employing these compositions for increasing the hydrophobic properties of surfaces, and to articles having surfaces of increased hydrophobic character so produced. More particularly, the invention is directed to water-soluble complex compounds of the Werner type in which trivalent nuclear chromium atoms are coordinated with acyclic carboxylic acido groups having at least ten carbon atoms, to processes for making these compositions comprising effecting contact, in the substantial absence of free water, of acyclic carboxylic acido groups having at least ten carbon atoms with basic trivalent chromium salts of monobasic acids, the basicity of the chromium salts being no greater than about fifty per cent, to processes in which hydrophobic properties of surfaces are increased by effecting contact of such surfaces with solutions of the before-mentioned chromi-nuclear complex compositions, and to articles having increased hydrophobic character by reason of the adsorption of such chromi-nuclear complex compositions upon their surfaces.

Attempts have already been made to use chromium compounds as waterproofing agents, but such procedures do not appear to have found wide commercial acceptance. This is in part explained by the lack of practicable means for applying such compounds to the materials to be waterproofed, particularly where the materials have the extended surfaces characteristic of paper and textiles. The means used for applying a waterproofing agent to such materials must be capable of effecting a considerable and substantially uniform dispersion of the waterproofing agent. Dissolving the waterproofing agent in an inert solvent provides a practicable way to effect such dispersion, and water is obviously the most desirable solvent to use.

Unfortunately, water has not heretofore been a suitable solvent from which to apply chromium-containing materials as waterproofing agents. The chromium-containing materials heretofore available are either water insoluble, or if water soluble, are so loosely held by the allegedly waterproofed surfaces that they are readily washed out upon further contact with water. Attempts have been made to apply chromium compounds as suspensions in water, but in such methods difficulties are encountered due to settling of the insoluble compounds and to lack of uniformity of distribution of the compounds on the surfaces.

Now I have found that by processes in which contact, in the substantial absence of free water, is effected between acyclic carboxylic acido groups having at least ten carbon atoms and basic trivalent chromium salts of monobasic acids, the basicity of the chromium salts being no greater than about fifty per cent, there may be produced novel, water-soluble complex compounds of the Werner type and that by contact with aqueous solutions of these compositions the hydrophobic properties of surfaces may be increased, the surfaces of increased hydrophobic character so produced being characterized by the presence thereon of adsorbed complex chromium compounds.

The water soluble waterproofing compositions of my invention are complex compounds of the Werner type and are not to be confused with the normal chromium salts. Thus, a composition of my invention in which the carboxylic acido groups are stearato groups, $CH_3(CH_2)_{16}COO^-$, differs radically in chemical composition from the normal chromic stearate, as is clearly evident from the fact that normal chromic stearate is insoluble in water. It is possible to explain such observed differences in properties on the basis of structure rather than empirical composition, and Werner's theory of complex compounds affords a convenient and logical basis for such an explanation.

According to the Werner theory, atoms may exert auxiliary valences as well as the principal valences occurring in simple compounds. These auxiliary valences may act to hold various groups to the atom exerting them, and the atom exerting the principal and auxiliary valences may become the nuclear atom of a complex compound or complex ion.

With particular reference to chromium it has been found that the total number of groups which may be held within the complex by the combined principal and auxiliary valences is six. The groups so held are referred to as "coordinated groups" and chromium is said to have a "coordination number" of six. Other groups may also be associated with the chromium, but when this is the case such additional groups are present as ions and are outside of the chromi-nuclear complex. Moreover, there may be more than one chromi-nuclear atom within the complex, the chromium atoms being linked together by reason of being coordinated thru common groups known as bridging groups. With respect to each chromium atom, each bridging group occupies but a single coordination position, so that an additional five coordination groups may be present on the atom.

In accordance with the above-stated Werner theory, the compositions of my invention may be described as Werner complex compounds characterized by having therein associated with a trivalent nuclear chromium atom an acyclic carboxylic acido group having at least ten carbon atoms. Such acido groups, which for convenience of reference will hereinafter be designated as "functional" acido groups, may be present as simple coordinated groups held by either principal or auxiliary valences, or they may be present as bridging groups between two nuclear chromium atoms. Particular acido groups may conveniently be designated by adding the suffix "ato" to the first portion of the name of the carboxylic acid corresponding to the acido group. For instance, stearic acid gives "stearato" groups, palmitic acid gives "palmitato" groups, and lauric acid gives "laurato" groups.

The fact that the functional acido groups are inside, rather than outside, the coordination spheres of the chromium atoms probably accounts for the solubility of the compositions in water and for their ability to be adsorbed upon surfaces from water solutions. It will be understood that there may be more than one chromium atom within the complex and that the chromium atoms may be held together by bridging groups other than acido groups, so that for each functional acido group there may be several nuclear chromium atoms within the complex, it being necessary only that within the complex there is at least one nuclear trivalent chromium atom coordinated with a functional acido group. Preferably, however, the number of chromium atoms per acyclic carboxylic acido group having at least ten carbon atoms will not be more than about ten.

The nature of my novel waterproofing compositions, their production, and use as waterproofing agents, and the character of the waterproofed articles produced will be better understood by reference to the following illustrative examples, but these examples are to be construed only as expositive and not as limiting.

Example I shows the preparation of a waterproofing composition of my invention in which the functional acido group is a stearato group.

EXAMPLE I

As the source of stearato groups stearic acid was used, and as the source of basic trivalent chromium salt of a monobasic acid there was used chromyl chloride which, although a hexavalent chromium compound initially, was reduced under the conditions of this example to a basic trivalent chromium salt. Effective contact of the stearic acid with the chromyl chloride and its reduction product was obtained by dissolving these reactants in an anhydrous non-reactive solvent, namely, carbon tetrachloride.

In a glass-lined reaction vessel equipped with a stirrer and reflux condenser 1279 parts by weight of stearic acid was dissolved in 11,200 parts by weight of anhydrous carbon tetrachloride, 207.5 parts of anhydrous ethyl alcohol was added to act as a reducing agent for the chromyl chloride subsequently to be used, and the solution was brought to a gentle boil under reflux. To this solution there was added gradually 6200 parts by weight of a solution prepared by dissolving 1400 parts of chromyl chloride in 4800 parts of anhydrous carbon tetrachloride. During this addition an exothermic reaction took place which maintained the solution at boiling temperature without the application of external heat. After addition of the chromyl chloride solution had been completed in two hours, the reaction mixture was refluxed for an additional one-half hour. At the end of this time the reflux liquid was slightly yellow in color, indicating the presence of unreduced chromyl chloride, and to complete the reduction 20 parts by weight of anhydrous ethyl alcohol dissolved in 128 parts of carbon tetrachloride was added, after which the reflux liquid became clear. Refluxing and stirring of the reaction mixture was then continued for an additional two hours to insure completion of reaction. The carbon tetrachloride was then distilled out of the product.

There was obtained as a product a dark green glassy solid. A portion of this product was found to dissolve slowly in water, the solution so obtained containing a small proportion of insoluble material. A piece of unsized paper, dipped in this solution and dried, was found to have remarkably increased resistance to rewetting by water.

In order to purify the reaction product, it was dissolved in the minimum amount of anhydrous methanol required to effect such dissolution at 60° C. This methanol solution was then chilled to 15° C. with constant stirring, a small part of the solute crystallizing out. This methanol-insoluble portion comprised about ten per cent by weight of the original anhydrous product and was found to be also water insoluble. The methanol-soluble portion, on the other hand, was found to be completely soluble in water.

Including the portion of the original product used for the waterproofing test, there was obtained altogether 2400 parts by weight of methanol-soluble product. This product was found by analysis to have the following constitution, it being understood that the constituents shown were present in the product in combined form:

*Analysis*

| | Per cent |
|---|---|
| Chromium | 17.03 |
| Chlorine | 18.38 |
| Acetic acid | 9.7 |
| Stearic acid | 43.0 |

From the foregoing analysis of the product purified by methanol extraction it can be calculated that the number of chromium atoms per stearato group in the product was 2.16.

From this purified product there was prepared a waterproofing solution containing 0.05 per cent of the product by weight. This solution was a clear, light green color and had a pH of about 3.0. This solution was used for waterproofing paper as follows:

An unsized kraft paper, having a ream weight of 116 pounds and a sheet thickness of .010 inch was sprayed on one side with the 0.05 per cent solution until 10 parts by weight of paper had absorbed 5 parts by weight of the solution, the spraying rate being so controlled that all the spray liquid was absorbed by the paper. The paper was then dried by subjecting it to a steam heated metal surface for thirty seconds, the temperature of the metal surface being about 115° C. After such drying the moisture content of the paper was about six and five-tenths per cent by weight.

When subjected to contact with water, the treated side of the paper was found to be remarkably waterproof. The extent to which hydrophobic character had been imparted to the paper by the treatment was determined in a quantitative manner by means of an electrical size tester. This tester was devised to indicate the rate of penetration of water thru sized paper and operated upon the principle that while dry paper is an insulator, paper which has been wet thru is a conductor of electric current. The apparatus consisted of a pair of electrodes, one of which was slidably mounted above the other in a manner such that a piece of paper could be inserted between the two and that contact between them would be prevented only by this paper. One of the electrodes had a flat horizontal metal surface, while the other consisted of a metal cup with a flat perforated bottom, the cup being connected to the rest of the circuit by an electrical conductor and having a weight mounted upon it in such a manner as to press the cup down firmly upon the flat electrode. These electrodes were connected in an electrical circuit which also comprised source of electric current and a galvanometer, so that when electrical contact was made between the electrodes the current would flow and a deflection of the galvanometer could be observed.

To measure the degree of waterproofness of a piece of paper with this instrument, the dry paper was placed between the two electrodes, the treated surface of the paper being uppermost. A tenth normal sodium chloride solution was poured into the cup electrode. The salt solution made contact with the treated surface of the paper thru the perforated bottom of the cup electrode, and if the paper was not to some extent waterproof the salt solution would immediately penetrate the paper and close the electrical circuit between the electrode by reason of the conductivity of the salt solution. On the other hand, if the paper were waterproof it would resist such penetration by the salt solution. The time required for penetration of the paper, measured from the instant the salt solution was poured into the cupped electrode until deflection of the galvanometer indicated the passage of an electric current, was taken as an indication of the relative waterproofness of the paper.

As measured by this electrical size tester, paper waterproofed as above described with the aqueous solution of the purified compositions of Example I was found to require three hundred forty seconds for penetration, whereas the sample of the untreated paper was penetrated in less than one second. It will be apparent, therefore, that a very considerable increase of hydrophobic character on the surface of the paper had been achieved.

The extremely effective nature of the waterproofing composition of Example I will be appreciated when it is considered that there was present upon the paper only about 5 mg. of waterproofing composition per square foot of treated surface. Moreover, the waterproofing composition was strongly adsorbed on the paper, not being removed even by prolonged soaking of the paper in water.

In the process used for producing the waterproofing composition of Example I, the presence of a basic trivalent chromium salt of a monobasic acid was effected by reducing chromyl chloride. The basic chromium compound was present only as an intermediate product and immediately coordinated with the functional acido group, that is, the stearato group present, to make the waterproofing composition. The first step in this reaction may be represented by the equation $$3C_2H_5OH + 2CrO_2Cl_2 \rightarrow 3CH_3CHO + 2Cr(OH)Cl_2 + 2H_2O$$

but it will be understood that the acetaldehyde thus formed may be further oxidized to acetic acid by reaction with additional chromyl chloride, and the basic chromic chloride, $Cr(OH)Cl_2$, may immediately form coordination complexes which include acetato groups derived from the acetic acid as well as the functional acido group derived from the stearic acid and which may also include coordinated aquo groups derived from the oxidation process of the initial step of the reaction.

Instead of reducing chromyl chloride with ethyl alcohol as in Example I, the reduction may be accomplished by stearyl alcohol, the reducing agent and the functional acido group thus being supplied from the single raw material, stearyl alcohol. Such a process is illustrated in Example II.

EXAMPLE II

The apparatus used in this example was the same as described in Example I. There was placed in the reaction vessel a solution containing 42.6 parts by weight of stearyl alcohol dissolved in 400 parts by weight of anhydrous carbon tetrachloride. The solution was heated to refluxing temperature and there was then added gradually over a period of forty-five minutes a solution containing 48.5 parts by weight of chromyl chloride dissolved in 250 parts by weight of anhydrous carbon tetrachloride. Refluxing was then continued for an additional forty minutes, after which the carbon tetrachloride was removed by distillation. There was obtained 87.9 parts by weight of a brittle, dark green residue.

An aqueous solution of this residue was found to contain a small amount of insoluble material, but nevertheless the solution had remarkable waterproofing action upon paper comparable to that exhibited by the product of Example I. By dissolving the product of Example II in hot methanol and chilling there was removed a small amount of methanol-insoluble material, and the methanol-soluble product was likewise water-soluble to give a perfectly clear light green solution. This aqueous solution was also used to waterproof paper with remarkable success.

On a dry basis the methanol-soluble product was found to contain the following constituents in combined form:

| | Per cent |
|---|---|
| Chromium | 15.4 |
| Chlorine | 17.5 |
| Stearic acid | 37.0 |

This analysis corresponds to about 2.2 atoms of chromium per stearato group.

From the methanol-purified product there was prepared a waterproofing solution containing 0.1 per cent of the product by weight having a clear light green color and a pH of about 3. This solution was used for waterproofing an unsized kraft paper as described in Example I. As measured by the electrical size tester, the waterproofed paper was found to require 305 seconds for penetration whereas the untreated paper required only one second, indicating a very considerable increase of hydrophobic character on the surface of the paper.

In Examples I and II it has been shown that contact between functional acido groups and basic trivalent chromium salts of monobasic acid may be effected by reducing a hexavalent chromium salt of the acid in the presence of the acido group. Instead of employing such a reduction step, a monobasic acid salt of trivalent chromium may be used directly, as shown in the following example:

EXAMPLE III

Upon heating and dehydration chromic chloride hexahydrate, $CrCl_3 \cdot 6H_2O$, undergoes a molecular rearrangement with the liberation of hydrogen chloride and production of a trivalent basic chromium salt. In this example the formation of this basic chromium salt was effected in the presence of a compound having a functional acido group, namely, stearic acid.

Solutions were made by dissolving 146.3 parts by weight of chromic chloride hexahydrate in 231 parts by weight of glacial acetic acid and 156.2 parts of stearic acid in 231 parts of glacial acetic acid. These solutions were mixed and agitated in a vessel fitted with a reflux condenser. The mixture was warmed almost to reflux temperature with constant stirring, and 333 parts by weight of acetic anhydride was slowly added. A reaction occurred with rapid evolution of heat, the charge in the vessel refluxing rapidly because of this heat of reaction. The stirring and refluxing were continued for three hours, after which uncombined acetic acid and acetic anhydride were evaporated. There was obtained 247 parts by weight of product. This crude product was purified by dissolving it in methanol and recrystallizing. The composition so purified had the following analysis:

| | Per cent |
|---|---|
| Chromium | 12.14 |
| Chlorine | 2.41 |
| Acetic acid | 29.91 |
| Stearic acid | 52.40 |

From the foregoing analysis it can be calculated that the number of chromium atoms per stearato group in the product was 1.27.

A waterproofing solution containing 0.1 per cent of the purified product by weight was prepared, using water as the solvent. This solution had a clear light green color and had a pH of about 3.0. Unsized paper was waterproofed by dipping it in this solution and drying it at about 115° C. As measured by the electrical size tester described in Example I, paper waterproofed in this manner was found to require about 88 seconds for penetration, whereas the untreated paper was penetrated in less than one second, indicating that a greatly increased hydrophobic character had been imparted to the paper by the waterproofing treatment.

It will be observed that each molecule of the chromic chloride initially used in Example III was associated with six molecules of water, the reaction being carried out under otherwise anhydrous conditions. It may be said, therefore, that the reaction in Example III was carried out in the substantial absence of free water because the water of hydration of the chromic chloride is not present as "free" water. The term "free water" is used to indicate water not chemically associated with the reactants or product as for instance, by hydration or coordination. It is noted that in reactions involving the reduction of a hexavalent chromium compound with an organic reducing agent such as ethyl alcohol as shown in Examples I and II there is formed some water of reaction. Under the conditions of such reaction, any water so produced ordinarily coordinates with the chromium compound and is present as free water only momentarily.

When a waterproofing composition is prepared by effecting contact in the substantial absence of free water between a functional acido group and a basic trivalent chromium salt of a monobasic acid in accordance with a process of my invention, it is usually preferable to prepare the basic trivalent chromium salt in situ as shown, for instance, in the foregoing Examples I, II, and III. Basic trivalent chromium salts have marked tendency to coordinate with hydroxyl groups, and, by reason of two chromium atoms coordinating with a single hydroxyl group, to form compounds of high molecular weight, this process being known as "olation." As olation takes place, compositions of high molecular weight are formed which are insoluble or only sparingly soluble in water. To minimize such olation it is ordinarily desirable to produce the basic trivalent chromium salt in the presence of the functional acido groups so that coordination may occur immediately. If desired, however, the basic trivalent chromium salt of a monobasic acid may be separately prepared and the coordination with a functional acido group may thereafter be effected. If the basic chromium salt is separately prepared, it is desirable to hold olation to a minimum by using the basic trivalent chromium salt as soon after preparation as feasible. An illustration of such a process of my invention is given in Example IV.

EXAMPLE IV

Equimolar quantities of chromic chloride hexahydrate $CrCl_3 \cdot 6H_2O$, and sodium hydroxide, NaOH, were caused to react by mixing 8 parts by weight of the chromic chloride dissolved in 50 parts of methanol with 1.18 parts of sodium hydroxide dissolved in 3.8 parts of methanol and boiling the mixture under reflux for 18 hours. There was thus obtained in solution a basic chromic salt having a basicity of 33.3 per cent, one chlorine atom in each molecule of chromic chloride having been replaced by a hydroxyl group from the sodium hydroxide. A Werner complex compound having a functional acido group was then prepared from this solution by adding an aliquot comprising one-sixtieth of the total solution to a methanol solution containing 0.143 part by weight of stearic acid in 4.3 parts of methanol and effecting reaction by boiling the mixture. There was obtained a Werner complex compound having a stearato group as a functional acido group, there being present one atom of trivalent chromium per stearato group.

A waterproofing solution was made by dissolving the entire methanol solution of the complex compound in 50 parts by weight of water. This solution was used for waterproofing an unsized kraft paper as described in Example I. As measured by the electrical size tester, the waterproofed paper was found to require 50 seconds for penetration whereas the untreated paper required only one second, indicating that an increase of hydrophobic character had occurred in the paper.

In Example IV, above, there is illustrated a process of my invention in which a basic trivalent chromium salt of a monobasic acid having a basicity of 33.3 per cent is coordinated with a functional acido group. The percentage of basicity of the chromium salt may be defined as a measure of the extent to which hydroxyl ions have replaced the anions of the monobasic acid in the chromic salt. For instance, chromic chloride hexahydrate, $CrCl_3 \cdot 6H_2O$, is a chromic salt of the monobasic acid, hydrogen chloride, having 0 per cent basicity. When, as in Example IV, the hydroxyl group replaces one of the chlorine atoms a basic salt, $Cr(OH)Cl_2 \cdot 6H_2O$, is formed, and since one-third of the anionic groups of the monobasic acid has been replaced, this composition is said to be 33 per cent basic. Similarly, if two of the chlorine atoms had been replaced, the compound would be 66.7% basic. In preparing the compositions of my invention I have found that the basicity of the trivalent chromium salt should not exceed about 50 per cent, and this is true whether the basic salt is separately prepared as in Example IV or is used as an intermediate compound as in Examples I, II, and III. Ordinarily I will prefer to use compounds having a basicity of from about 15 to 50 per cent, while still more particularly I may employ to advantage compounds of 25 to 40 per cent basicity.

A basic trivalent chromium salt of a type well adapted for use in the processes of my invention may be prepared by heating chromic chloride hexahydrate, whereby hydroxyl groups replace chlorine atoms in the salt and hydrochloric acid is evolved. If such heating of the hexahydrate is carried out in the presence of a functional acido group, coordination between the basic chromium salt and the acido group immediately occurs and a waterproofing composition of my invention results. Example V, which follows, illustrates such a process.

EXAMPLE V

In a suitable reaction vessel 21.3 parts by weight of chromic chloride hexahydrate were melted and to the molten mass was added 11.4 parts by weight of stearic acid, the mixture being maintained at about 175° C. for 15 minutes. A reaction product was obtained which was a dark grey-green mass, brittle at room temperature. The product was completely soluble in hot ethanol. When a portion of the ethanol solution was poured into cold water, a slightly turbid solution was obtained which had a definite waterproofing action upon paper. When the remainder of the ethanol solution was chilled to 10° C. and filtered, a filtrate containing 13 parts by weight of solids was obtained, and this filtrate when poured into water gave a perfectly clear solution having a very strong waterproofing action on paper, a 0.1 per cent solution waterproofing paper to such an extent that penetration as measured by the electrical size tester required six minutes whereas the untreated paper required about one second. The portion of the product soluble in cold ethanol was found by analysis to have the following composition:

| | Per cent |
|---|---|
| Chromium | 15.1 |
| Stearic acid | 35.2 |
| Chlorine | 21.9 |

This analysis indicates a molecular ratio of about 2.3 atoms of the chromium per stearato group.

When effecting reaction between fused chromic chloride hexahydrate and a functional acido group in accordance with a process of my invention, the functional acido group may be derived from salts or esters containing the acido group as well as from the free acid itself. It can be assumed that the first step in the reaction is a replacement of a chlorine atom with a hydroxyl group to give a basic chromic chloride followed by reaction between this basic salt and a hydrolysis product of the salt or ester of the functional group. Thus, instead of the stearic acid used in Example V, sodium stearate might have been used, the sodium stearate presumably hydrolyzing or reacting with the liberated hydrogen chloride to give free stearato groups.

Acyclic carboxylic acido groups having at least ten carbon atoms may be caused to coordinate with trivalent nuclear chromium atoms by such processes as those shown in Examples I thru V to give waterproofing compositions in accordance with my invention. In the foregoing examples the functional acido group employed was the stearato group, a saturated straight chain fatty acid having a total of 18 carbon atoms including the carbon of the carboxyl group. In Examples VI thru XI which follow, there is shown the use of various other acyclic carboxylic acido groups having at least ten carbon atoms.

EXAMPLE VI

In this example the functional acido group was the acido group of arachidic acid, $C_{19}H_{39}COOH$. In 237 parts by weight of carbon tetrachloride was dissolved 15.5 parts of arachidic acid, and 6.75 parts by weight of anhydrous ethanol was added. The mixture was placed in a reaction vessel fitted with a reflux condenser, brought to reflux temperature, and 23.1 parts of chromyl chloride dissolved in 126 parts of carbon tetrachloride were slowly added to the refluxing mixture. The carbon tetrachloride was then removed by evaporation, leaving 37.9 parts by weight of product. The product was purified by dissolving it in 146 parts of hot methanol, chilling the methanol solution to 5° C. and filtering off the precipitate thus formed. The filtrate so obtained was found to be completely soluble in water, a solution containing 0.1 per cent total solids having very strong waterproofing properties.

By analysis it was found that product contained a ratio of three chromium atoms per acido group.

EXAMPLE VII

In 316 parts by weight of carbon tetrachloride was dissolved 19.8 parts by weight of cerotic acid, $C_{25}H_{53}COOH$, and 2.3 parts of ethanol. The solution was brought to refluxing temperature in a suitable reaction vessel and 15.5 parts by weight of chromyl chloride dissolved in 126 parts of carbon tetrachloride was slowly added, and the reaction product was refluxed for one-half hour. The carbon tetrachloride was then removed by evaporation and the residue taken up in boiling methanol. The methanol solution was then chilled to 5° C. and a precipitate which formed was filtered off. The filtrate containing the cold methanol soluble product was miscible in water to give a clear green solution. A solution containing 0.1 per cent of the product waterproofed paper to such an extent that 24 seconds were required for penetration as measured with the electrical size tester described in Example I whereas untreated paper required less than one second for penetration.

EXAMPLE VIII

A solution containing 12.12 parts by weight of cetyl alcohol, $C_{16}H_{33}OH$, in 158 parts by weight of carbon tetrachloride was placed in a reaction vessel and brought to reflux temperature. A solution containing 15.5 parts by weight of chromyl chloride in 111 parts of carbon tetrachloride was slowly added. After the reaction ceased, the product was refluxed for one-half hour and the carbon tetrachloride was then removed by evaporation. There was obtained 27.5 parts by weight of reaction product. This product was purified by dissolving it in 100 parts of boiling methanol, chilling to precipitate cold methanol-insoluble material, and filtering. The precipitate consisted of 1.8 per cent of the weight of reaction product. The filtrate gave clear aqueous solutions at a solids concentration of 0.1 per cent. These solutions had a waterproofing action on paper such that penetration of the waterproofed paper required 102 seconds for penetration as measured by the electrical size tester described in Example I, whereas the untreated paper required only one second.

EXAMPLE IX

A solution containing 25.6 parts by weight of palmitic acid, $C_{15}H_{31}COOH$, and 4.68 parts by weight of ethanol was made up, placed in a reaction vessel fitted with a reflux condenser, and brought to reflux temperature. A solution containing 31.0 parts by weight of chromyl chloride in 237 parts of carbon tetrachloride was slowly added after which the reaction mixture was refluxed for thirty minutes. The carbon tetrachloride was then removed by evaporation, leaving 56 parts by weight of dry product. Ten parts by weight of this product was purified by dissolving in 250 parts of hot methanol, chilling and filtering. The crude reaction product was found to be 97.1 per cent soluble in cold methanol. Other portions of the crude product were similarly purified using isopropanol and butyl carbitol as solvents. It was found that the crude product was 96.92 per cent soluble in cold isopropanol and 99.4 per cent soluble in cold butyl carbitol.

Aqueous solutions were made up containing 0.1 per cent respectively of product purified with each of the above-named solvents. Paper waterproofed with each of these solutions and tested on the electrical size tester as described in Example I required the following times for penetration:

| Purification solvent | Seconds required for penetration |
| --- | --- |
| Methanol | 162 |
| Butyl carbitol | 144 |
| Isopropanol | 114 |
| Untreated paper | 1 |

It will be seen from Example IX that complex compositions containing trivalent chromium atoms coordinated with functional acido groups may be purified with various solvents if desired.

EXAMPLE X

A solution was made up containing 10 parts by weight of lauric acid, $C_{11}H_{23}COOH$, and 2.3 parts of ethanol in 158 parts by weight of carbon tetrachloride. This solution was brought to reflux temperature in a suitable reaction vessel and a solution of 15.5 parts by weight of chromyl chloride in 103 parts of carbon tetrachloride was slowly added. After reaction, the solution was refluxed for one-half hour, after which carbon tetrachloride was removed by evaporation leaving 26 parts by weight of dry solid reaction product. This product was completely soluble in cold methanol at a concentration of about 16 per cent. The methanol solution gave somewhat turbid solutions when poured into water, but nevertheless, the aqueous solution at 0.1 per cent concentration waterproofed paper to an extent such that 96 seconds was required for penetration as measured by the electrical size tester described in Example I, whereas the untreated paper required only one second for penetration.

EXAMPLE XI

A solution containing 14.12 parts by weight of oleic acid, $C_{17}H_{33}COOH$, and 2.3 parts of ethanol in 237 parts by weight of carbon tetrachloride was brought to refluxing temperature in a suitable reaction vessel, and a solution containing 15.5 parts by weight of chromyl chloride in 103 parts of carbon tetrachloride was slowly added. After the reaction had ceased, the reaction mixture was refluxed for 30 minutes and the carbon tetrachloride was then removed by evaporation. There was obtained 26 parts by weight of dry solid product. This product was purified by dissolving it in hot methanol, chilling, and filtering. An aqueous solution containing 0.1 per cent by weight of product soluble in cold methanol was found capable of imparting a highly hydrophobic surface to paper, the paper so treated requiring 96 seconds for penetration as measured with the electrical size tester described in Example I as compared with one second for the untreated paper.

In the foregoing examples it has been shown that various acids and alcohols may be used as the source of a functional acido group for coordination with a trivalent chromium atom in accordance with a process of my invention. These functional acido groups may, for instance, be the negative groups found in the saturated normal fatty acids having at least 10 carbon atoms, that is, capric, undecoic, lauric, tridecoic, myristic, pentadecoic, palmitic, margaric, stearic, nondecoic, or arachidic acids, or higher acids of this homologous series. Similarly, the functional acido group may be the negative groups of olefinic carboxylic acids having more than 10 carbon atoms. Thus, such acids as undecylenic, myristelenic, palmitolenic, and oleic may be used. The functional acido groups may also be derived from carboxylic acids having more than one unsaturated linkage such as linoleic, linolenic, elaeostearic, or clupanodonic acids. The functional acido groups may also be derived from carboxylic acids having branch carbon chains in which the total number of carbon atoms in the chain is at least ten.

It is not necessary that the source of the functional acido group be a chemically pure material, and in fact, substantial economies may be achieved in many instances by employing naturally occurring mixtures of compounds containing functional acido groups or capable of giving functional acido groups. Functional acido groups may be derived, for instance, from such materials as cocoanut oil or hydrogenated cocoanut oil acids or alcohols, vegetable oils such as cottonseed oil, hydrogenated cottonseed oil, soya bean oil, linseed oil, animal fats and oils, and fish oil. Various substituted fats and oils may likewise be employed, such, for instance, as normal ethanol palmitamide and alpha-amino stearic acid. A variety of other sources of acyclic carboxylic acido groups having at least ten carbon atoms will be readily apparent to those skilled in the art.

While the functional acido groups which are coordinated with trivalent chromium atoms in the compositions of my invention must contain at least ten carbon atoms, optimum results are obtained when the number of carbon atoms does not exceed about 25, since groups having more than about twenty-five carbon atoms give Werner complex compounds with chromium which are difficultly water soluble. Compositions produced according to processes of my invention by effecting coordination between trivalent chromium atoms and acido groups having from about fifteen to eighteen carbon atoms are preferred compositions both from the standpoint of high waterproofing action and solubility in water, and also because such functional acido groups are readily available at low cost.

In order to secure maximum waterproofing ability and at the same time retain a satisfactory degree of water solubility, the ratio of nuclear trivalent chromium atoms per functional acido group within the complex preferably should be from about 1:1 to about 10:1. When two or more nuclear chromium atoms are coordinated with a single acido group within the complex, the chromium atoms may be coordinated with each other thru bridging groups. Various groups may function in this bridging capacity, examples, for instance, being hydroxyl (OH), aquo ($H_2O$), and acido groups, either functional or non-functional.

The groups, other than the functional acido groups, with which chromium atoms are coordinated in the compositions of my invention are of secondary importance only. These groups preferably should be, from the standpoint of valence, either neutral or monovalent. The neutral groups are of course held by auxiliary valence bonds, aquo groups ($H_2O$) being a typical example. The monovalent groups are negative and are typified by such groups as chloro, fluoro, bromo, formato, acetato and nitrato groups. It will be observed that groups of this type are characteristic of the anions of monobasic acids and that chromium compounds containing them are salts of monobasic acids. In the foregoing examples the use of salts of the monobasic acid, hydrochloric acid, in the preparation of compositions of my invention has been illustrated. In Example XII which follows there is shown the use of a salt of the monobasic acid, hydrofluoric acid, in which fluoro rather than chloro groups are coordinated with the chromium.

EXAMPLE XII

A solution was made up containing 2.84 parts by weight of stearic acid and 0.69 part of ethanol in 31.7 parts of carbon tetrachloride. A stream of dry air saturated with chromyl fluoride vapor at about 25° C. was then passed thru this solution until the solution had taken on a dark green color. The carbon tetrachloride was then removed from the reaction vessel by evaporation, leaving a dark green residue. This residue was purified by dissolving it in hot methanol, chilling and filtering. The filtrate containing the cold methanol-soluble product was miscible with water, the aqueous solution having a marked waterproofing effect upon unsized paper.

The use of still another basic chromium salt, chromic nitrate, for the preparation of a waterproofing composition of my invention is illustrated in Example XIII.

EXAMPLE XIII

A solution of basic chromic nitrate in methanol was prepared containing 56.6 parts by weight of chromic nitrate having a basicity of about 33 per cent, the salt corresponding to the formula $Cr(OH)(NO_3)_2 \cdot 5H_2O$. A methanol solution containing 28.4 parts by weight of stearic acid was also prepared. These solutions were mixed and the mixture was warmed. There was obtained an alcoholic solution of stearato chromic nitrate which was completely soluble when poured into cold water, giving clear solutions. An aqueous solution containing 0.1 per cent of the solid reaction product had a strong waterproofing action on paper.

The compositions of my invention are relatively soluble in water, but in order to aid their dissolution it may be found desirable to dissolve them in a non-aqueous solvent and then form a water solution by dissolving the non-aqueous solution in water. For the convenience of users, I may therefore offer my novel compositions to the trade in the form of solutions in non-aqueous solvents, such as the ethanol or methanol solutions of the foregoing examples.

When a waterproofing composition of my invention, prepared under anhydrous conditions, is dissolved in water a migration of groups originally coordinated with the nuclear chromium atom may take place. For instance, a chloro group within the chromi-nuclear complex may be replaced by an aquo group, the chlorine so displaced migrating outside of the complex. This kind of rearrangement and the olation thru bridging groups previously discussed may take place simultaneously, so that in some instances the solubility of the composition may be adversely affected upon long standing in aqueous solution. However, the actions take place gradually, so that ample time is ordinarily afforded for the application of the aqueous solutions to waterproofing uses.

My novel complex compounds of the Werner type in which trivalent nuclear chromium atoms are coordinated with acyclic carboxylic acido groups having at least ten carbon atoms are broadly applicable to the problem of increasing the hydrophobic properties of surfaces. This increase in the hydrophobic character of surfaces is produced by effecting contact of the surfaces with aqueous solutions of the complex chromium compounds as, for instance, has been shown in the foregoing examples with respect to paper. This increase in hydrophobic character may amount to changing a normally hydrophilic substance to one which is markedly hydrophobic, or it may merely constitute making more hydrophobic a substance which is normally hydrophobic. The results of applying a waterproofing process of my invention to a material such as paper may be evidenced throughout the material as though the material had been completely impregnated. However, it appears probable from the relatively small amount of waterproofing agent required that the action is primarily a surface phenomenon. The highly hydrophobic character of the surface produced makes it appear likely that an orientated layer of the waterproofing material is fixed upon the surface of the material waterproofed. According to this theory of my invention, the polar portion of the complex compound becomes fixed to the surface, leaving the non-polar and therefore water repellent portion of the compound, represented by the functional acido group, as a water repellent oriented surface layer.

The application of a waterprofing composition of my invention to the surface to be waterproofed is preferably effected by preparing an aqueous solution of the composition and applying this aqueous solution to the surface to be treated, removing any undesired excess, and drying the material so treated. I have found that an aqueous solution containing from about 0.05 to about 2.0 per cent of waterproofing composition is particularly well adapted to produce the desired results, since in this concentration range the distribution of the waterproofing agent is particularly uniform.

A wide variety of surfaces may be given increased hydrophobic character by the processes and compositions of my invention. The compositions are particularly applicable to surfaces which are negatively charged in aqueous solutions at a pH of from about 2 to about 6. Examples of materials which may be waterproofed by the processes of my invention include cellulosic materials, either fibrous such as cotton cloth, linen cloth or paper as shown in the foregoing examples, or non-fibrous such as Cellophane. Further examples are glass, in the form either of sheet glass or fibrous glass cloth, clay, sand, asbestos, asbestos-cement compositions, and materials of similar character. Certain of these applications are illustrated in the following example.

EXAMPLE XIV

An aqueous waterproofing solution was made up containing 0.5 per cent by weight of a complex chromium compound having a functional acido group prepared by the reaction of chromyl chloride, ethanol and stearic acid as described in Example I. In this waterproofing solution a piece of unsized cotton broadcloth was impressed for five minutes. The cloth was then removed from the solution, wrung out and dried in an oven for 20 minutes at 140° C. The fabric was found to be remarkably resistant to wetting by water, the surface of the cloth having a distinctly hydrophobic character. The hydrophobic surface thus imparted was resistant to laundering as was demonstrated by washing the fabric in a ¼ per cent soap solution at 50° C. for one minute, rinsing it in cold water, and drying. Even after this laundering action the cloth had a highly hydrophobic surface.

EXAMPLE XV

Into an aqueous solution of chromyl chloride-stearic acid reaction product prepared as in Example XIV there was immersed a piece of glass fabric which had been produced by weaving fine glass filaments. The pH of the solution was 3.1. The glass fabric was removed after two minutes' immersion, rinsed with water at a pH of 6, and dried for 15 minutes at 140° C. The glass fabric so treated was markedly water repellent and had a softer feel than the control, indicating that the treatment had rendered the fabric water repellent and at the same time it had acted as a lubricant for the glass filament.

EXAMPLE XVI

A suspension was made up containing one part by weight of kaolin in 100 parts of water and the pH of the suspension was adjusted to 4.0. To this suspension was then added a solution containing 0.25 part by weight of the reaction product of chromyl chloride and stearic acid as prepared in Example I dissolved in 2 parts by weight of methanol. The mixture was stirred for 5 minutes, filtered, and thoroughly washed with water at a pH of 6.0. The clay was then dried at 110° C. The clay so treated was found to be strongly water repellent, and when suspended in a mixture of 10 parts of engine oil and 90 parts of water with strong agitation, the clay passed into the oil phase. A similar test was made with untreated clay, and it was found that the clay was easily wetted and remained in the aqueous phase. Thus, it is observed that by treatment with a composition of my invention, the clay had been transformed from a hydrophilic to a hydrophobic substance.

EXAMPLE XVII

Ten parts of 60 mesh silica sand were suspended in 50 parts by weight of water at a pH of 3.0. A solution containing 0.16 part by weight of a chromyl chloride-stearic acid reaction product prepared as described in Example I in 0.75 part by weight of methanol was added to the aqueous suspension of sand and the mixture was stirred for five minutes. The sand was then filtered from the mixture and thoroughly washed with water at a pH of 6.0. The treated wet sand was then added to a mixture consisting of 10 parts of engine oil and 90 parts of water and shaken. The sand entered the oil phase, the oil which previously floated on the surface being carried to the bottom with the sand and forming a sand-oil phase. Untreated sand when shaken with a similar mixture of oil and water picked up only a small part of the oil, the remainder forming an upper layer upon the water.

It is therefore seen that such materials as sand may be given a hydrophobic surface by treatment according to a process of my invention. Such surfaces behave as organophilic surfaces when in the presence of such organic liquids as oil. The consequence of this type of surface upon sand will be readily apparent when it is considered that the flow of oil thru such treated sand in the presence of water is greatly facilitated as compared with untreated sand.

The ability of complex chromium compounds of my invention to impart hydrophobic character to surfaces may also be used to advantage for rendering polymeric materials water-insoluble, or water-resistant. For example, polyvinyl alcohol, either as sheets or films, or as coatings on supporting fabrics, may advantageously be insolubilized with compositions of my invention such as, for instance, stearato chromic chloride prepared as in Example I. This is illustrated in Example XVIII.

EXAMPLE XVIII

A solution containing 0.16 part by weight of chromyl chloride-stearic acid reaction product prepared as described in Example I, in 0.75 part by weight of methanol was diluted by the addition of 50 parts by weight of methanol.

A film of polyvinyl alcohol was dipped for one second in this solution and air dried, followed by drying at 110° C. for 5 minutes.

The treated film was much more water resistant than an untreated film. The untreated film rapidly softened in water at 30° C. while the treated film retained its strength for approximately five times as long as an untreated film which had been similarly heated.

The use of complex chromium compounds of the Werner type having a functional acido group as waterproofing agents in accordance with a process of my invention may be facilitated by observing certain precautions. Thus, it should be noted that aqueous solutions of such waterproofing compositions are not permanently stable at a pH above about 3.5, and if used at higher pH values such aqueous solutions should be used as soon as possible after preparation. At a pH above about 6 hydrolysis of the compositions occurs with such rapidity that proper application of the waterproofing agent to hydrophilic surfaces becomes impracticable.

It is also desirable when employing aqueous solutions of the waterproofing compositions of my invention to avoid the presence of ions which give precipitates with basic chromic salts. Such ions, for example, as pyrophosphate, silicate, ferrocyanide, sulfate, and other polyvalent anions have undesirable effects. Since there normally is no occasion to have such ions present in waterproofing processes, little trouble is usually encountered in avoiding them.

The increase in hydrophobic characteristics of surfaces obtained by the processes of my invention is usually accompanied by an increase in the organophilic properties of the surfaces. Thus, paper which has been made difficult to wet with water by treatment with a chromi-nuclear complex compound containing an acyclic carboxylic acido group having at least 10 carbon atoms is at the same time made easier to wet with an organic material such as machine oil or wax, even in the presence of much moisture. Important use may be made of this property in processes in which preferential wetting with an organic solvent in the presence of water is desired. For example, wood may be treated to improve the adherence of oil paints in applications where the wood is subjected to exposure to moisture.

My novel water-soluble complex compounds of the Werner type in which trivalent nuclear chromium atoms are coordinated with acyclic carboxylic acido groups having at least 10 carbon atoms have physical and chemical properties which render them valuable for other uses in addition to waterproofing. Thus, the compositions, in addition to making glass cloth water repellent, act as a lubricant for the fibres of the cloth and cause the cloth to be much softer and less brittle. Another use is in the treatment of clay or other silicious material such as asbestos, sand, sandstone, granite, etc. to render it water repellent and more readily wetted by oils even in the presence of water. Another use is in the treatment of metals to prevent corrosion. This action may be due in part at least to the prevention of wetting of the surfaces of the metal. Another use is to treat sands rendering them preferentially wetted by oil for oil well treatment or oil filter treatment. The compounds may also be used in the tanning of hides and skins. A variety of other uses will be apparent to those skilled in the art upon the basis of an appreciation of the foregoing description of the physical and chemical properties of the compounds.

While in the foregoing description of my invention I have shown certain specific waterproofing compositions and processes for making them and certain specific waterproofing processes and waterproofed products, it will be understood that one skilled in the art may employ numerous processes and compositions and produce numerous compositions without departing from the spirit of this invention.

I claim:

1. A composition comprising a complex compound of the Werner type in which a trivalent nuclear chromium atom is coordinated with an acylic carboxylic acido group having at least ten carbon atoms.

2. A water-soluble composition comprising a complex compound of the Werner type in which trivalent nuclear chromium atoms are coordinated with acyclic carboxylic acido groups having at least ten carbon atoms, the ratio of chromium atoms to acyclic carboxylic acido groups having at least ten carbon atoms being not greater than about 10:1.

3. A water-soluble composition comprising a complex compound of the Werner type in which a trivalent nuclear chromium atom is coordinated with a stearato group.

4. A water-soluble composition comprising a complex compound of the Werner type in which a trivalent nuclear chromium atom is coordinated with a palmitato group.

5. A water-soluble composition comprising a complex compound of the Werner type in which a trivalent nuclear chromium atom is coordinated with a laurato group.

6. A water-soluble composition comprising a complex compound of the Werner type in which trivalent nuclear chromium atoms are coordinated with stearato groups, the ratio of chromium atoms to stearato groups being not greater than about 10:1.

7. In a process for producing water-soluble complex compounds of the Werner type in which trivalent nuclear chromium atoms are coordinated with acyclic carboxylic acido groups having at least ten carbon atoms, the step comprising effecting contact, in the substantial absence of free water, of an acyclic carboxylic acido group having at least ten carbon atoms with a basic trivalent chromium salt of a monobasic acid, the basicity of the chromium salt being no greater than about fifty per cent.

8. In a process for producing water-soluble complex compounds of the Werner type in which trivalent nuclear chromium atoms are coordinated with acyclic carboxylic acido groups having at least ten carbon atoms, the step comprising effecting contact, in the substantial absence of free water, of an acyclic carboxylic acido group having at least ten carbon atoms with a basic trivalent chromium salt of a monobasic acid, the basicity of the chromium salt being no greater than about fifty per cent and the ratio of chromium atoms to acido groups being not greater than about 10:1.

9. In a process for producing water-soluble complex compounds of the Werner type in which trivalent nuclear chromium atoms are coordinated with acyclic carboxylic acido groups having at least ten carbon atoms, the step comprising reducing chromyl chloride to a salt of trivalent chromium while in contact with an acyclic carboxylic acido group having at least ten carbon atoms and in the substantial absence of free water.

10. In a process for producing water-soluble complex compounds of the Werner type in which trivalent nuclear chromium atoms are coordinated with stearato groups, the step comprising effecting contact, in the substantial absence of free water, of a stearato group with a basic trivalent chromium salt of a monobasic acid, the basicity of the chromium salt being no greater than about fifty per cent.

11. In a process for producing water-soluble complex compounds of the Werner type in which trivalent nuclear chromium atoms are coordinated with stearato groups, the step comprising effecting contact, in the substantial absence of free water, of a stearato group with a basic trivalent chromium salt of a monobasic acid, the basicity of the chromium salt being no greater than about fifty per cent and the ratio of chromium atoms to stearato groups being not greater than about 10:1.

12. In a process for increasing the hydrophobic properties of a surface, the step comprising effecting contact of the surface with a complex compound of the Werner type in which a trivalent nuclear chromium atom is coordinated with an acyclic carboxylic acido group having at least ten carbon atoms.

13. In a process for increasing the hydrophobic properties of a surface, the step comprising effecting contact of the surface with an aqueous solution of a complex compound of the Werner type in which a trivalent nuclear chromium atom is coordinated with an acyclic carboxylic acido group having at least ten carbon atoms.

14. In a process for increasing the hydrophobic properties of a surface, the step comprising effecting contact of the surface with an aqueous solution of a complex compound of the Werner type in which trivalent nuclear chromium atoms are coordinated with stearato groups, the ratio of chromium atoms to stearato groups being not more than about 10.

15. An article having hydrophobic properties and characterized by the presence on its surface of an adsorbed coating of a complex compound of the Werner type in which a trivalent nuclear chromium atom is coordinated with an acyclic carboxylic acido group having at least ten carbon atoms.

16. A cellulosic material having hydrophobic properties and characterized by the presence on its surface of an adsorbed coating of a complex compound of the Werner type in which a trivalent nuclear chromium atom is coordinated with an acyclic carboxylic acido group having at least ten carbon atoms.

17. A siliceous material having hydrophobic properties and characterized by the presence on its surface of an adsorbed coating of a complex compound of the Werner type in which a trivalent nuclear chromium atom is coordinated with an acyclic carboxylic acido group having at least ten carbon atoms.

18. Polyvinyl alcohol having hydrophobic properties and characterized by the presence on its surface of an adsorbed coating of a complex compound of the Werner type in which a trivalent nuclear chromium atom is coordinated with an acyclic carboxylic acido group having at least ten carbon atoms.

RALPH K. ILER.